United States Patent
Lian et al.

(10) Patent No.: US 11,262,923 B2
(45) Date of Patent: Mar. 1, 2022

(54) METHOD FOR MANAGING NAMESPACES IN A STORAGE DEVICE USING AN OVER-PROVISIONING POOL AND STORAGE DEVICE EMPLOYING THE SAME

(71) Applicant: SAMSUNG ELECTRONICS CO., LTD., Suwon-si (KR)

(72) Inventors: Xiang Lian, Cupertino, CA (US); Chao Yang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/013,451

(22) Filed: Sep. 4, 2020

(65) Prior Publication Data
US 2022/0011953 A1  Jan. 13, 2022

Related U.S. Application Data

(60) Provisional application No. 63/049,533, filed on Jul. 8, 2020.

(51) Int. Cl.
G06F 3/06 (2006.01)
(52) U.S. Cl.
CPC .......... *G06F 3/0631* (2013.01); *G06F 3/0604* (2013.01); *G06F 3/0644* (2013.01); *G06F 3/0679* (2013.01)
(58) Field of Classification Search
CPC .............................. G06F 3/0631; G06F 3/0644
See application file for complete search history.

(56) References Cited

U.S. PATENT DOCUMENTS 6,804,761 B1  10/2004  Chen et al.
2012/0233417 A1  9/2012  Kalach et al.
(Continued)

FOREIGN PATENT DOCUMENTS

KR  10-2009-0076265 A  7/2009

OTHER PUBLICATIONS

Murphy, VMware vSAN + NVMe namespace magic: Split 1 SSD into 24 devices for great storage performance, Micron Blog, Sep. 25, 2019 [retrieved from internet Sep. 8, 2021][<URL:https://www.micron.com/about/blog/2019/september/vmware-vsan-nvme-namespace-magic-split-1-ssd-into-24-devices-for-great-performance>] (Year: 2019).*

(Continued)

*Primary Examiner* — David Yi
*Assistant Examiner* — Nicholas A. Paperno
(74) *Attorney, Agent, or Firm* — Lewis Roca Rothgerber Christie LLP

(57) ABSTRACT

A provided a storage device configured to support a number of namespaces. The storage device includes a memory and a controller coupled to the memory. The controller includes a host interface layer and a flash translation layer configured to report to the host interface layer a first over-provisioning chunk from an over-provisioning pool and a first chunk separate from the over-provisioning pool. The controller is configured to receive a command at the host interface layer to utilize a portion of the memory for a first namespace from among the number of namespaces and the first namespace includes an unaligned chunk. The controller is configured to utilize the first over-provisioning chunk as the unaligned chunk of the first namespace. A number of over-provisioning chunks to be utilized as unaligned chunks is less than the number of namespaces.

18 Claims, 9 Drawing Sheets

(56) References Cited

U.S. PATENT DOCUMENTS

| | | |
|---|---|---|
| 2013/0013880 A1 | 1/2013 | Tashiro et al. |
| 2013/0332690 A1 | 12/2013 | Seo et al. |
| 2015/0046659 A1 | 2/2015 | Wu |
| 2017/0024137 A1* | 1/2017 | Kanno .................. G06F 3/0644 |
| 2017/0242722 A1* | 8/2017 | Qiu ....................... G06F 3/0655 |
| 2017/0262176 A1 | 9/2017 | Kanno |
| 2019/0121547 A1 | 4/2019 | Frolikov |
| 2019/0146907 A1* | 5/2019 | Frolikov ............... G06F 3/0679 |
| | | 711/103 |
| 2019/0155537 A1 | 5/2019 | Frank et al. |

OTHER PUBLICATIONS

Disclosure of Prior Art, 9 pages.

* cited by examiner

METHOD FOR MANAGING NAMESPACES IN A STORAGE DEVICE USING AN OVER-PROVISIONING POOL AND STORAGE DEVICE EMPLOYING THE SAME

CROSS-REFERENCE TO RELATED APPLICATION

This application claims priority to and the benefit of U.S. Provisional Application No. 63/049,533, filed on Jul. 8, 2020, entitled "Achieve Logical Block Size Granularity on Namespace Management," the entire content of which is incorporated by reference herein.

BACKGROUND

1. Field

Aspects of one or more embodiments of the present disclosure relate to a method for managing namespaces in a storage device and a storage device employing the method.

2. Description of the Related Art

In recent years, advancements in computer technology have introduced electronic devices into all aspects of life. As the amount of information stored electronically (e.g., photos, videos, music, documents, etc.) exponentially increases, user demand for storage capacity has increased. However, software and/or hardware limitations may lead to capacity loss when allocating namespaces requested by a user. Therefore, efforts are being made to accommodate the needs of users while reducing capacity loss.

Recent advancements in storage technology, in particular solid-state storage devices (e.g., solid-state drives (SSDs)), provide several advantages over traditional mechanical storage devices, such as hard disk drives (HDDs). Further, new protocols for accessing data stored on this new generation of storage devices have been developed, including the Non-Volatile Memory Express (NVMe) protocol.

The above information disclosed in this Background section is for enhancement of understanding of the background of the present disclosure, and therefore, it may contain information that does not constitute prior art.

SUMMARY

One or more example embodiments of the present disclosure are directed to a system and method for namespace management.

According to one embodiment of the present disclosure, there is provided a storage device configured to support a number of namespaces. The storage device includes a memory and a controller coupled to the memory. The controller includes a host interface layer and a flash translation layer configured to report to the host interface layer a first over-provisioning chunk from an over-provisioning pool and a first chunk separate from the over-provisioning pool. The controller is configured to receive a command at the host interface layer to utilize a portion of the memory for a first namespace from among the number of namespaces and the first namespace includes an unaligned chunk. The controller is configured to utilize the first over-provisioning chunk as the unaligned chunk of the first namespace. A number of over-provisioning chunks to be utilized as unaligned chunks is less than the number of namespaces.

The controller may further include an internal memory and the number of over-provisioning chunks to be utilized as unaligned chunks is based on an amount of the internal memory of the controller.

A type of the memory of the storage device may be triple-level cell flash, quad-level cell flash, or Z-NAND type, and the number of namespaces may be based on the type of the memory.

The host interface layer may include a visible chunk pool including the first chunk and a hidden chunk pool including the first over-provisioning chunk. The host interface layer may be configured to report information about the visible chunk pool to a host and to hide information about the hidden chunk pool from the host, and the host may be configured to send the command to the storage device to utilize the portion of the memory for the first namespace from among the number of namespaces.

The controller may be further configured to utilize the first over-provisioning chunk for the first namespace on a first-come, first-serve basis.

The controller may be further configured to utilize the first over-provisioning chunk based on a privacy designation, a format, or a group number of the first namespace.

The controller may be further configured to utilize the first over-provisioning chunk based on a potential capacity loss of the first namespace associated with the first namespace being above or below a set threshold.

The controller may be further configured to utilize the first over-provisioning chunk based on a size of the first namespace being above or below a set threshold.

A system may include a storage device and a host may be configured to send the command to the storage device to utilize the portion of the memory for the first namespace from among the number of namespaces.

According to one embodiment of the present disclosure, there is provided a method of managing namespaces in a storage device. The method including supporting, by the storage device, a number of namespaces, reporting, by a flash translation layer of a controller of the storage device, to a host interface layer of the controller of the storage device a first over-provisioning chunk from an over-provisioning pool and a first chunk separate from the over-provisioning pool, receiving, by the storage device, a command at the host interface layer to utilize a portion of a memory for a first namespace from among the number of namespaces, the first namespace including an unaligned chunk, and utilizing, by the controller, the first over-provisioning chunk as the unaligned chunk of the first namespace. A number of over-provisioning chunks to be utilized as unaligned chunks is less than the number of namespaces.

The method may further include supporting, by the controller, the number of over-provisioning chunks to be utilized as unaligned chunks, the number of over-provisioning chunks being based on an amount of an internal memory of the controller.

The method may further include supporting the number of namespaces based on a type of the memory of the storage device, wherein the type of the memory is triple-level cell flash, quad-level cell flash, or Z-NAND type.

The method may further include reporting, by the host interface layer, to a host information about a visible chunk pool including the first chunk, hiding, by the host interface layer, information about a hidden chunk pool including the first over-provisioning chunk from the host, and sending, by the host, the command to the storage device to utilize the portion of the memory for the first namespace from among the number of namespaces.

The method may further include utilizing, by the controller, the first over-provisioning chunk for the first namespace on a first-come, first-serve basis.

The method may further include utilizing, by the controller, the first over-provisioning chunk based on a privacy designation, a format, or a group number of the first namespace.

The method may further include utilizing, by the controller, the first over-provisioning chunk based on a potential capacity loss of the first namespace associated with the first namespace being above or below a set threshold.

The method may further include utilizing, by the controller, the first over-provisioning chunk based on a size of the first namespace being above or below a set threshold.

According to one embodiment of the present disclosure, there is provided a method of managing namespaces in a storage device, the storage device including a memory and a controller, the controller including a host interface layer and a flash translation layer. The method includes reporting, by the flash translation layer, to the host interface layer a first over-provisioning chunk from an over-provisioning pool and a first chunk separate from the over-provisioning pool, receiving, by the controller, a first command at the host interface layer to utilize a first portion of the memory for a first namespace, the first namespace including a first unaligned chunk associated with a first potential capacity loss, utilizing, by the controller, the first over-provisioning chunk as the first unaligned chunk of the first namespace, receiving, by the controller, a second command at the host interface layer to utilize a second portion of the memory for a second namespace, the second namespace including a second unaligned chunk; and utilizing, by the controller, the first chunk as the second unaligned chunk of the second namespace.

The method may further include supporting, by the controller, a number of over-provisioning chunks to be utilized as unaligned chunks, the number of over-provisioning chunks being based on an amount of an internal memory of the controller.

The method may further include supporting, by the storage device, a number of namespaces based on a type of the memory of the storage device, wherein the type of the memory is triple-level cell flash, quad-level cell flash, or Z-NAND type. The method may further include reporting, by the host interface layer, to a host information about a visible chunk pool including the first chunk, hiding, by the host interface layer, information about a hidden chunk pool including the first over-provisioning chunk from the host, sending, by the host, the first command to the storage device to utilize the first portion of the memory for the first namespace, and sending, by the host, the second command to the storage device to utilize the second portion of the memory for the second namespace.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
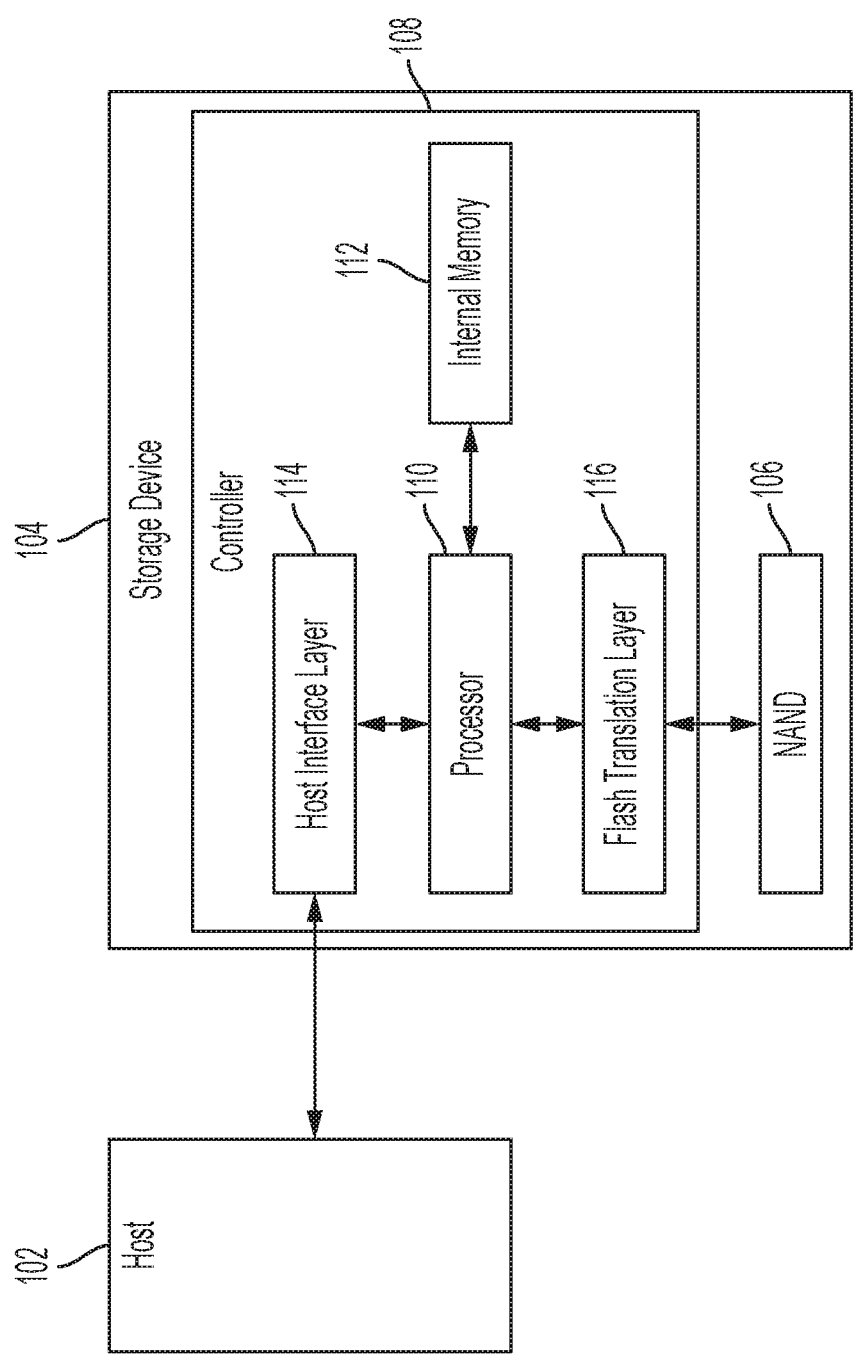
FIG. 1 is a system diagram according to one or more embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, a host may request that a storage device create a namespace. A "namespace" refers to a quantity of non-volatile memory formatted into logical blocks where the namespace has a size equal to the combined size of n logical blocks. As used herein, a "logical block" refers to the smallest unit for I/O commands (e.g., Read and Write commands) in the NVMe specification to address data, and each of the logical blocks of the namespace may have a corresponding LBA (e.g., a LBA from 0 to (n−1)).

Creating multiple namespaces may be useful to a host for a variety of reasons. For example, namespaces may provide logical separation, multi-tenancy, security isolation, and/or the like. To create a namespace, the host may send a request to a controller of the storage device where the host specifies attributes of the namespace (e.g., the format of the namespace, a group number associated with the namespace, shared or private designation, a range of logical block addresses, and the like).

In response to the request, a controller of the storage device may use chunks of memory for a namespace. A "chunk" (i.e., a logical page number (LPN) range) refers to the smallest addressable unit that the storage device hardware supports when using memory of the storage device for a namespace.

Because the size of the logical blocks requested by the host may not match the size of a chunk, the host may request a number of logical blocks corresponding to a total size that is not divisible by or is a multiple of the size of one chunk. Therefore, the total size of the logical blocks requested for a namespace may not be aligned with (i.e., may not equal) the size of one or more chunks used for the namespace. As such, an unaligned chunk (i.e., a chunk that is only partially addressable by the namespace) may be used by the controller of the storage device with a portion of the unaligned chunk being un-addressable. For example, a portion of the unaligned chunk may be un-addressable because the host has not provided logical blocks and associated LBAs corresponding to the full capacity of the chunk. The portion of the unaligned chunk that may be un-addressable may result in capacity loss of the storage device.

In a non-limiting example, a host may request the creation of two namespaces with each namespace having a size of 256 kilobytes (kBs). However, the storage device may not recognize chunks of memory that, alone or in aggregate (i.e., one or more chunks), equal exactly 256 kBs. For example, the storage device may have hardware that supports a chunk size of 1 gigabyte (GB). A first chunk may be used for a first namespace of the two namespaces and a second chunk may be used for a second namespace of the two namespaces. 256 KBs of the first chunk may be addressable (e.g., by the host) as part of the first namespace, but the remaining 999.744 megabytes (MB) of the first chunk may be un-addressable. Similarly, 256 KBs of the second chunk may be addressable as part of the second namespace, but the remaining 999.744 MB of the second chunk may be un-addressable. Therefore, each namespace may result in 999.744 megabytes (MBs) of the storage device that may be un-addressable. In other words, the size difference between 1 GB and 256 kBs may be un-addressable for each of the two namespaces. Accordingly, creation of the two 256 kB namespaces, in this case, may lead to a capacity loss of 1.999488 GBs of the storage device.

As another non-limiting example, the host may request the creation of a namespace with a size of 1.1 GBs. In this non-limiting example, the storage device may recognize chunks of 1 GB and may use two chunks to accommodate the namespace with a size of 1.1 GBs. For example, a first chunk may accommodate 1 GB of the namespace and a second chunk may accommodate 0.1 GBs of the namespace. The remaining 0.9 GBs of the second chunk may be un-addressable. Therefore, the namespace may result in 0.9 GBs of the storage device that may be un-addressable. Accordingly, creation of the namespace, in this case, may lead to a capacity loss of 0.9 GBs of the storage device.

According to one or more embodiments of the present disclosure, a controller of the storage device uses chunks from an over-provisioning pool (OP pool) as unaligned chunks to avoid capacity loss and achieve logical block size granularity. In other words, a chunk from the OP pool may absorb an unaligned chunk. The unaligned chunks in the OP pool generally remain unmapped which results in no OP loss. In other words, using the chunks from the OP pool for the unaligned chunks of namespaces may not affect the operations performed by the OP pool of the storage device such as, for example, wear leveling, garbage collection, and the like.

Further, in one or more embodiments of the present disclosure, the controller of the storage device may support less chunks from the OP pool to be used as unaligned chunks than the total number of namespaces that the storage device supports. Therefore, some of the namespaces may be provided with logical block size granularity using chunks from the OP pool and some of the namespaces may be provided with chunk size granularity.

In one or more embodiments, the controller of the storage device may provide logical block size granularity using chunks from the OP pool on a first-come, first-serve basis. However, the present disclosure is not limited thereto. For example, in one or more embodiments, the controller of the storage device may consider a number of factors when using chunks from the OP pool as unaligned chunks such as the size of the namespace, the number of available chunks in the OP pool, the format (e.g., logical block size and/or whether metadata supporting end-to-end protection is provided) of the namespace, shared vs. private designation, the amount of potential capacity loss, the number of namespaces supported, and/or the like.

Accordingly, a system and method are provided that reduce capacity loss associated with creating a namespace by using chunks from the OP pool as unaligned chunks according to set (e.g., predetermined) logic.

FIG. 1 is a system diagram according to one or more embodiments of the present disclosure.

Referring to FIG. 1, a system includes a host 102 and a storage device 104. In one or more embodiments, the host 102 may be housed with (e.g., may be integral with) the storage device 104, and in other embodiments, the host 102 may be separate from the storage device 104.

The host 102 may include a processor, such as a central processor unit (CPU), and a host memory. The storage device 104 may include a controller 108 (e.g., a storage controller or SSD controller) and a memory. In one or more embodiments, the memory may include one or more flash memory cells. For example, the storage device 104 may be a solid-state storage device (SSD), and the memory may be NAND 106 (e.g., a plurality of NAND memory cells) connected to the controller 108.

In one or more embodiments, the host 102 may communicate with the storage device 104 via a Peripheral Component Interconnect Express (PCIe) interface (e.g., a PCIe bus). However, the present disclosure is not limited thereto. For example, the host 102 may communicate with the storage device 104 via an Ethernet bus, NVMe over Fabrics or any other suitable bus known to those with ordinary skill in the art.

In one or more embodiments, the controller 108 of the storage device 104 may include a processor 110, such as a CPU, and an internal memory 112 (e.g., DRAM, SRAM, flash memory, and/or the like). Logic stored in the internal memory 112 (e.g., DRAM) and/or firmware (e.g., ASIC or FPGA) may be used or executed by the processor 110 for carrying out one or more processes or process modules described herein, such as, for example, the functions of a host interface layer 114 (HIL) and a flash translation layer 116 (FTL). The HIL 114 of the controller 108 may be configured to communicate with the host 102 and the FTL 116 of the controller 108 may be configured to provide or map LPNs converted from LBAs at the HIL 114 to physical addresses in the NAND 106 of the storage device 104.

In one or more embodiments, the HIL 114 receives commands and/or data from the host 102. The host 102 may request from the HIL 114 the attributes of existing namespaces, the total capacity of the visible chunks, the capacity available for allocating a namespace, the chunk size, the total number of namespaces supported, and the like to provide information for a user. In response, the HIL 114 of the controller 108 of the storage device 104 may send or provide the attributes of existing namespaces, the total capacity of the visible chunks, the capacity available for allocating a namespace, the chunk size, the total number of namespaces supported, and/or the like.

However, in one or more embodiments, the HIL 114 maintains a pool of hidden chunks from an OP pool, and the HIL 114 hides the hidden chunks from the host 102. In other words, the HIL 114 may have a visible chunk pool and a hidden chunk pool such that the HIL 114 reports the attributes of the visible chunk pool to respond to requests (e.g., requests for information) from the host 102, and the HIL 114 does not report attributes of the hidden chunk pool to the host 102 in response to requests (e.g., requests for information) from the host 102.

In one or more embodiments, the host 102 may allow a user to select the size of the namespace, format, and the like, when creating or requesting a new namespace. The size of the namespace may be equal to one or more logical blocks where one logical block is the smallest unit for I/O commands (e.g., Read and Write commands) in the NVMe specification to address data. Logical block size may be selectively set in the format of the namespace. Therefore, logical block size may vary for different namespaces depending on the demands of the user and/or the host 102. As an example, the host may set in the format of the namespace a logical block size of any suitable value such as, for example, 512 bytes or 4 kB. The host 102 may address different logical blocks associated with the namespace using LBAs. In other words, each logical block of a namespace may correspond to a different LBA from among an LBA range.

The host 102 may send, to the HIL 114, a command to create the namespace including the LBA range associated with the namespace. The HIL 114 may organize or map the LBAs to LPNs of the storage device 104. In other words, the HIL 114 may convert LBAs from the host 102 to LPNs of the storage device 104. The LPNs of the HIL 114 may then be used to communicate with or send requests to the FTL 116 such that the FTL 116 may map or translate the LPNs to corresponding physical addresses in the NAND 106.

Although a particular approach for mapping at the HIL 114 and the FTL 116 is described, any suitable approach for mapping as known to those of ordinary skill in the art may be used with suitable adjustments thereto.

In one or more embodiments, the chunk associated with a chunk entry (CE) may be referenced by multiple LBAs from the perspective of the host 102 and/or multiple LPNs (i.e., an LPN range) from the perspective of the controller 108 of the storage device 104. Because the size of the logical blocks associated with an LBA range requested by the host may not match the size of a chunk, the host may request a number of logical blocks corresponding to a total size that is not divisible by or is a multiple of a size of one chunk. In other words, the total size of the logical blocks requested by the host may not match (e.g., precisely or exactly match) the total size of one or more chunks used or required to support all the logical blocks requested by the host. Therefore, the host 102 may request a number of logical blocks corresponding to a total size that is not divisible by or is a multiple of a size of one chunk. In this case, the storage device 104 may round up the number of chunks used in order to provide enough capacity for the namespace requested by the host 102. The rounding difference may be equal to the capacity loss associated when creating the namespace because the rounding difference may become un-addressable after being used for the namespace. As a result, one chunk (e.g., the rounded up chunk) used for a namespace may be an unaligned chunk (i.e., a chunk where a portion may be un-addressable after creating the namespace thereby resulting in capacity loss).

In one or more embodiments, the chunk size may be based on the capacity of the NAND 106 and the number of chunk entries supported by the hardware of the storage device 104. For example, the chunk size may be equal to the capacity of the NAND 106 divided by the number of chunk entries. In a non-limiting example, 2000 chunk entries may be supported and the capacity of the NAND 106 (e.g., drive capacity) may be 2 terabytes (TBs). In this case, a chunk size of 1 GB may be provided by the storage device 104 because 2 TB divided by 2000 equals 1 GB. Therefore, in this case, each chunk entry refers to a chunk (or LPN range) containing 1 GB. However, the present disclosure is not limited thereto, and any chunk size may be used depending on the number of chunk entries supported by the hardware of the storage device 104 and the size of the NAND 106 (i.e., the total drive capacity). For example, the storage device hardware may support 2048 chunk entries and the storage device 104 may have a drive capacity of 32 TB. In this case, a chunk size of 15.625 GB may be provided by the storage device 104.

Figure 2A:
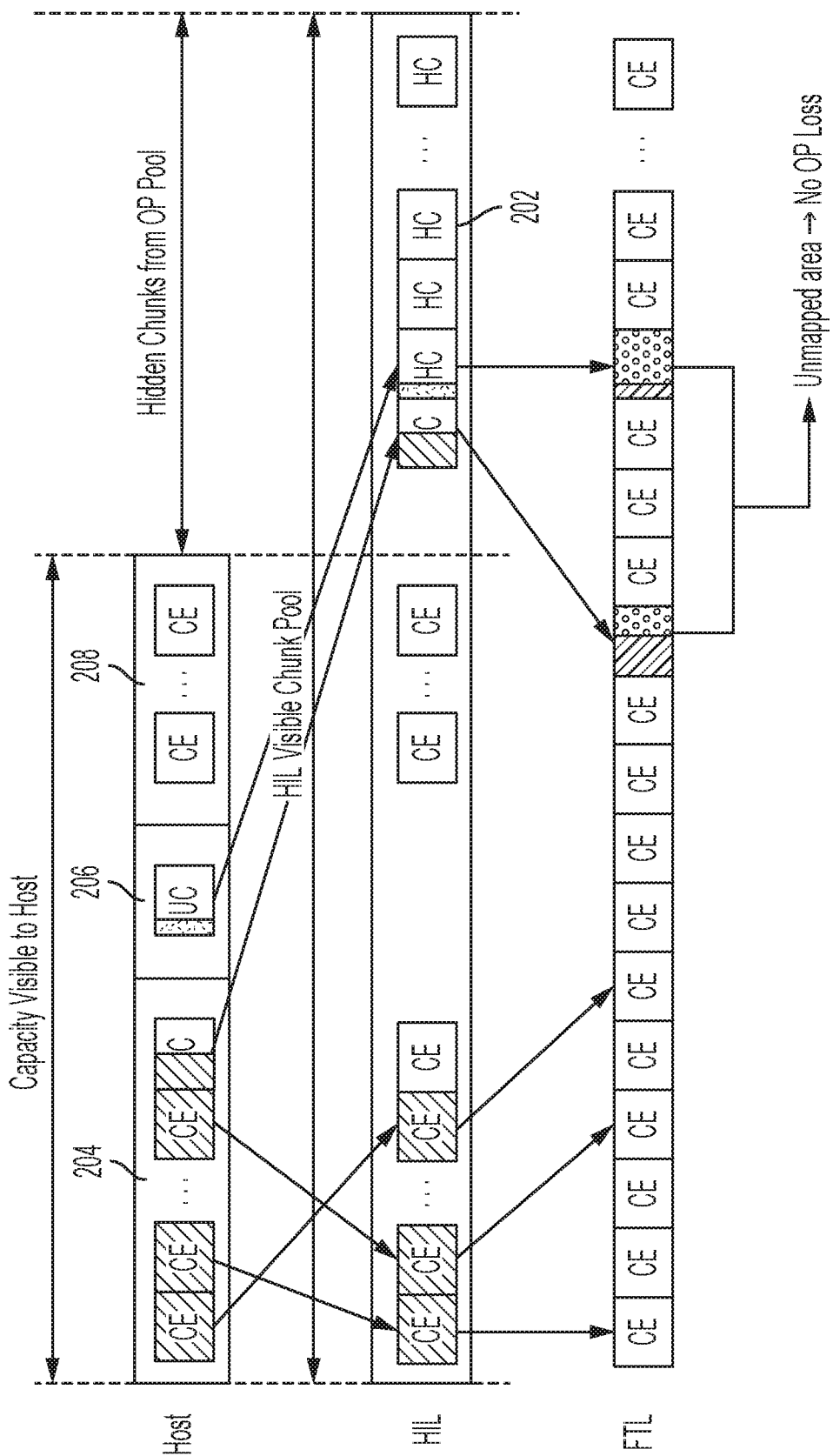
FIG. 2A is a block diagram illustrating an example of namespace management based on a first-come, first-serve basis according to one or more embodiments of the present disclosure.
Figure 2B:
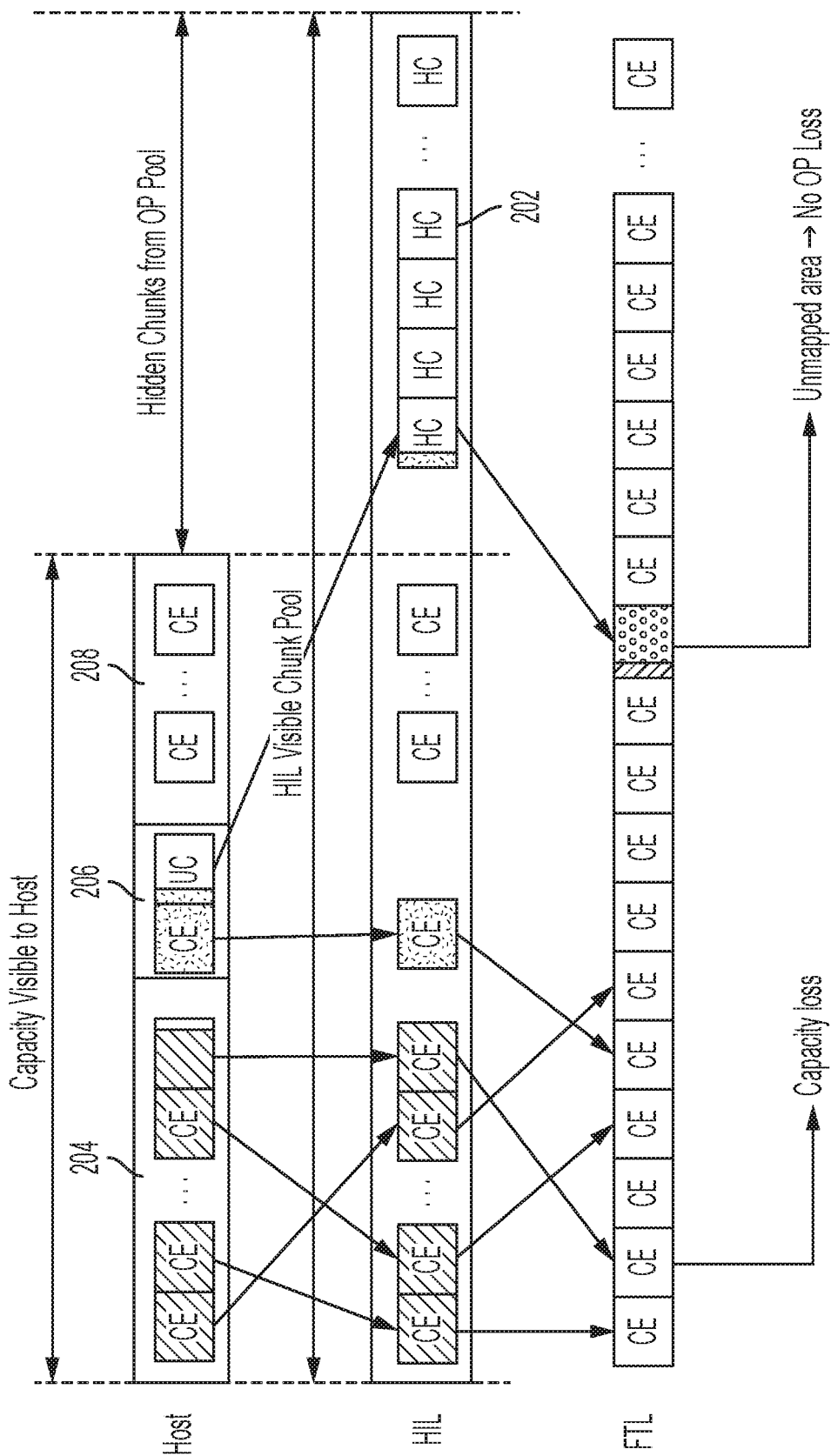
FIG. 2B is a block diagram illustrating an example of namespace management based on capacity loss according to one or more embodiments of the present disclosure.
Figure 2C:
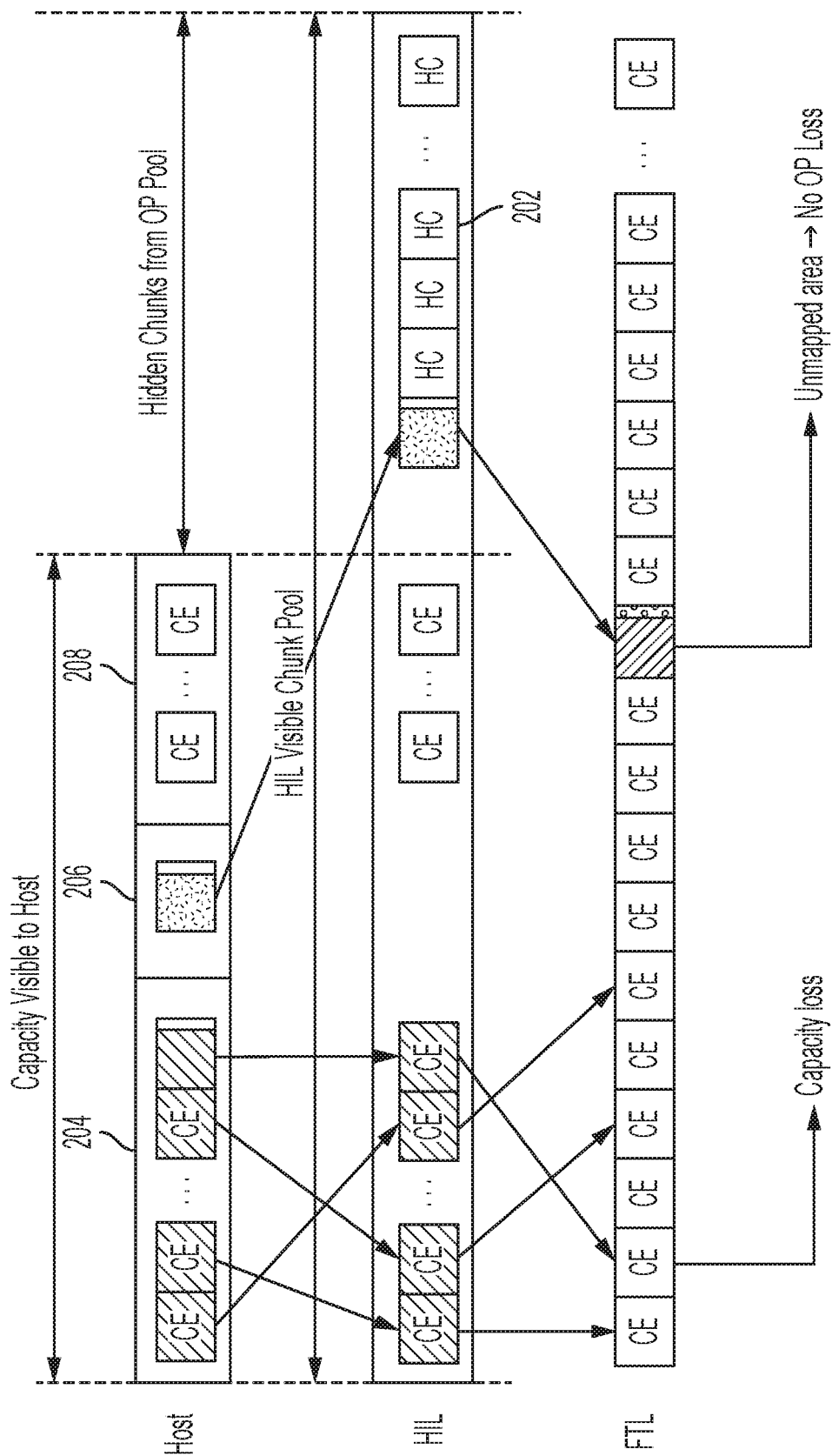
FIG. 2C is a block diagram illustrating an example of namespace management based on a size of a namespace according to one or more embodiments of the present disclosure.

FIG. 2A is a block diagram illustrating an example of namespace management based on a first-come, first-serve basis according to one or more embodiments of the present disclosure. FIG. 2B is a block diagram illustrating an example of namespace management based on capacity loss according to one or more embodiments of the present disclosure. FIG. 2C is a block diagram illustrating an example of namespace management based on a size of a namespace according to one or more embodiments of the present disclosure.

Referring to FIGS. 1 and 2A-2C, the interactions between the host 102 and the storage device 104 are illustrated based on chunk entries (CE) for convenience. Each CE may correspond to a range of LBAs from the perspective of the host 102 and a range of LPNs from the perspective of the controller 108. Because the size of the logical blocks associated with an LBA range requested by the host may not match (e.g., precisely or exactly match) the size of a chunk, the host may request a number of logical blocks corresponding to a total size that is not divisible by or is a multiple of the size of one chunk. Therefore, the total size of the logical blocks requested for a namespace may not be aligned with (i.e., may not equal) the size of one or more chunks used for the namespace. As such, an unaligned chunk (i.e., a chunk that is only partially addressable by the namespace) may be used by the controller of the storage device with a portion of the unaligned chunk being un-addressable as shown in FIGS. 2A-2C. In the illustrated embodiment, an unaligned chunk is designated as a (UC) for convenience and may be referred to as a UC below. Further, hidden chunks that are hidden from or not reported to the host 102 may be designed as hidden chunks (HCs) for convenience.

In a comparative example, the HIL may include a visible chunk pool and no hidden chunk pool. As such, the HIL may provide (or advertise) the entire capacity of the HIL to the host. In this case, the FTL including chunks corresponding to the OP pool and chunks separate from the OP pool, may only report the chunks separate from the OP pool to the HIL and hide the chunks in the OP pool from the HIL. In other words, all of the chunks of the HIL are visible to the host and chunks from the OP pool are not reported by the FTL to the HIL.

However, as shown in FIGS. 1 and 2A-2C, in one or more embodiments, the FTL 116 may report chunks separate from the OP pool 202 to the HIL 114 and report one or more chunks of the OP pool 202 to the HIL 114. As such, the chunks from the OP pool 202 reported to the HIL 114 by the FTL 116 but hidden from the host 102 by the HIL 114 may be HCs. For example, as shown in FIGS. 2A-2C, all of the chunks in the OP pool 202 reported to the HIL 114 are hidden from the host 102, and therefore, may be HCs.

As shown in FIG. 2A, UCs may be absorbed by the HCs from the OP pool 202 on a first-come, first-serve basis by using HCs from the OP pool 202 as the UCs on a first-come, first-serve basis. For example, if an UC is formed in response to a host 102 request to create a namespace, then a chunk from the OP pool 202 from among the HCs of the HIL 114 may be used as the UC. If a UC is not formed in response to the host 102 request to create a namespace, then no chunks from the OP pool 202 may be used because applying logical block size granularity instead of chunk size granularity may not save capacity (e.g., saving capacity by avoiding capacity loss). Therefore, the one or more chunks of the OP pool 202 that are HCs may be saved for subsequent namespace creation requests where logical block size granularity may be desirable.

In one or more embodiments, chunks from the OP pool 202 may be suitable for use as the UCs because the chunks from the OP pool 202 are unmapped areas (i.e., unmapped areas of NAND 106). Therefore, the use of chunks from the OP pool 202 results in no OP pool 202 loss. In other words, operations performed by the OP pool 202 such as, for example, wear leveling, garbage collection, and/or the like, may not be affected by the chunks from the OP pool 202 being used as the UCs.

In the illustrated embodiment, the host 102 may request creation of a first namespace 204 and a second namespace 206 from among unused chunks 208 reported to the host 102 from the visible chunk pool at the HIL 114. Because the total size of the logical blocks requested by the host 102 for each of the first namespace 204 and the second namespace 206 may not be divisible by or be a multiple of the size of one chunk as shown in FIGS. 2A-2C, each of the first namespace 204 and the second namespace 206 may be unaligned namespaces where the first namespace 204 includes an UC and the second namespace 206 includes an UC. According to chunk size granularity, a portion of the UCs of each of the first namespace 204 and the second namespace 206 may become un-addressable resulting in capacity loss. Therefore, to avoid capacity loss, HCs (e.g., HCs from the OP pool 202) at the HIL 114 may be used as the UCs associated with the first namespace 204 and the second namespace 206 such that logical block size granularity may be provided for the first namespace 204 and the second namespace 206 according to the first-come, first-serve basis.

In one or more embodiments, the use of HCs as shown in FIGS. 2A-2C may prevent or substantially prevent the host from recognizing a change in available capacity in order to indicate that logical block size granularity is provided for the namespace whose UC was absorbed by the OP pool 202 (i.e., an HC from the OP pool 202 was used as the UC). As such, visible chunks that would otherwise be used and partially un-addressable resulting in visible capacity loss may remain visible and available to the host 102 as unused for use in subsequent namespace requests. In other words, the host does not receive an indication of capacity loss. Accordingly, the storage device 104 may report to the host no capacity loss due to unaligned chunks by taking advantage of the HCs In one or more embodiments, as shown in FIGS. 1 and 2B-2C, a visible chunk of the HIL 114 separate from the chunks from the OP pool 202 may be used for a UCs of a namespace depending on set (e.g., predetermined) logic as will be described in more detail below. In this case, there may be a capacity loss associated with the creation of the namespace due to the UCs resulting in a partially un-addressable chunk. As such, chunk size granularity is provided for the namespace and the creation of the namespace may cause the host 102 to recognize a corresponding capacity loss because the visible chunk used as the UC may be unavailable for subsequent namespaces.

In one or more embodiments, chunks from the OP pool 202 reported by the FTL 116 to the HIL 114 to be used as UCs may be less than the total number of namespaces supported by the controller 108 of the storage device 104. For example, different NAND types such as triple-level cell flash (TLC), quad-level cell flash (QLC), and Z-NAND may support different set numbers of namespaces from each other. The FTL 116 may use internal memory 112 (e.g., DRAM) to support a set number of chunks from the OP pool 202 to be used as HCs, and the set number of chunks of the OP pool 202 to be used for UCs may depend on the amount of internal memory available. For example, increasing the number of chunks of the OP pool to be used as HCs may cause an increase in the amount of internal memory 112 (e.g., DRAM) used. Therefore, in one or more embodiments, depending on the NAND 106 type of the storage device 104 and the amount of available internal memory 112 of the controller 108, the total number of namespaces supported by the controller 108 may be greater than the set number of chunks from the OP pool 202 to be used as UCs supported by the controller 108.

In one or more embodiments, the system and methods of the present disclosure include build time customizable features depending on NAND type and suitable product variants. Therefore, a host may connect to multiple storage devices that have the same or different NAND types (i.e., mixed drive types), and the host may send a request to one or more of the connected storage devices as desired to allocate one or more namespaces.

In a non-limiting example, the controller 108 of the storage device 104 may support creation of, for example, up to 64 namespaces (e.g., depending on the NAND type) corresponding to up to 64 visible chunks or CEs thereby providing a total capacity for namespace creation of 64 multiplied by the chunk size (i.e., size of the chunk corresponding to a CE). In this case, for example, the controller 108 of the storage device 104 may support 32 chunks (e.g., depending on the internal memory 112 or DRAM) from the OP pool 202 to be used as HCs. Depending on the size of the namespaces requested by the host 102, the host 102 may request creation of more than 32 namespaces (e.g., between 33 to 64 namespaces). If a first-come, first-serve basis is applied and more than 32 UCs are concurrently present, then a chunk of the OP pool 202 may not be available to be used as the 33rd UC thereby leading to capacity loss when a visible chunk separate from the OP pool 202 is used as the 33rd UC.

Although specific numbers for the namespaces and chunks of the OP pool to be used as UCs are provided, the present disclosure is not limited thereto and any suitable number may be used depending on hardware and/or software constraints.

While a first-come, first-serve basis is provided in reference to FIG. 2A, the present disclosure is not limited thereto. In one or more embodiments, any other suitable logical arrangements may be considered when using chunks from the OP pool 202 to be used as UCs.

For example, as shown in FIG. 2B, because the total size of the logical blocks requested by the host 102 for each of the first namespace 204 and the second namespace 206 may not divisible by or be a multiple of the size of one chunk as shown in FIGS. 2A-2C, each of the first namespace 204 and the second namespace 206 may be unaligned namespaces where the first namespace 204 includes an UC and the second namespace 206 includes an UC. According to chunk size granularity, a portion of the UCs of each of the first namespace 204 and the second namespace 206 may become un-addressable resulting in capacity loss. The amount of un-addressable memory that may be formed according to chunk size granularity may be used as a factor to determine whether HCs from the OP pool 202 should be used to provide logical block size granularity. In this case, a threshold may be used where if more than a set amount of memory will become un-addressable due to the UC (i.e., if capacity loss exceeds a set amount), then an HC of the OP pool 202 is used to provide logical block size granularity (assuming an HC of the OP pool 202 is available). Therefore, as shown in FIG. 2B, a UC of the first namespace 204 which may form un-addressable memory below the threshold may use a chunk from the visible chunk pool of the HIL 114 resulting in minor capacity loss (i.e., a chunk from the visible chunk pool of the HIL 114 may be used as the UC of the first namespace 204). On the other hand, as shown in FIG. 2B, a UC of the second namespace 206 which may be associated with a potentially greater amount of capacity loss than the UC of the first namespace 204, may be above the threshold, and therefore, may use an HC from the OP pool 202 (i.e., an HC from the OP pool 202 may be used as the UC of the second namespace 206) to achieve logical block size granularity and thereby avoid the potentially greater amount of capacity loss.

As another example, as shown in FIG. 2C, the size of the namespace may be used as a factor to determine whether HCs from the OP pool 202 should be used to provide logical block size granularity. In this case, using HCs from the OP pool 202 may be based on the size of the namespace requested. For example, a threshold may apply HCs to unaligned chunks where the size of the namespace is less than one chunk. Therefore, as shown in FIG. 2C, the first namespace 204 with a size greater than one chunk and having a UC may form un-addressable memory resulting in capacity loss. However, the second namespace 206 with a size less than one chunk and having a UC may use an HC from the OP pool 202 to achieve logical block size granularity and thereby avoid capacity loss.

Although a number of arrangements are separately described with reference to FIGS. 2A-2C, logical arrangements according to one or more embodiments may be based on a combination of the arrangements presented in FIGS. 2A-2C.

In one or more embodiments, a threshold or multi-threshold approach may be used where one or more of the logical arrangements may be implemented according to one or more thresholds. For example, the unused capacity of NAND 106 may be used to determine whether to provide logical block size granularity and, if so, which among one or more logical arrangement for applying logical block size granularity should be applied. In other words, the system and method for providing logical block size granularity may be provided when unused capacity for namespaces is below or above a set threshold. In a non-limiting example, logical block size granularity may be provided on a first-come, first-serve basis when less than 20% of the chunks in the visible pool of the HIL 114 are unused chunks 208.

In one or more embodiments, a dynamic approach (as opposed to a static approach) may be used to determine use of chunks from the OP pool 202 as UCs. For example, in one or more embodiments, the controller 108 may, in real-time or at set intervals of time (e.g., when a namespace request is received), dynamically adjust whether an HC from the OP pool 202 is used as a UC based on a priority of the namespace including the UC. In a non-limiting example, the HCs from the OP pool 202 may be used on a first-come, first-serve basis until all of the HCs have been used as UCs where each UC corresponds to a separate namespace. As additional namespaces including UCs are requested, the controller 108 may determine a priority associated with each of the namespaces including UCs. For example, the controller 108 may determine that using a chunk from the OP pool 202 as one UC results in potentially less capacity loss than using the chunk from the OP pool 202 as another UC associated with a different namespace. In this case, the namespace that may result in lower capacity loss is lower priority than the priority of the namespace that may result in higher capacity loss.

Therefore, although all of the HCs from the OP pool 202 at the HIL 114 have been used, the controller 108 may change the HC used as the UC of the lower priority namespace and to be used as the UC of the higher priority namespace thereby reducing potential capacity loss. If a namespace including an UC is lower priority than all the of the namespaces for which a chunk from the OP pool has been used, the change may not occur. Prior to performing the change, the controller 108 may use a chunk of NAND 106 separate from the OP pool 202 (e.g., a chunk of memory in the visible chunk pool) at the HIL 114 to accommodate the memory of the lower priority namespace that may have been previously absorbed by the HC from the OP pool 202. In other words, the data previously absorbed by the HC from the OP pool 202 may be copied to a chunk of NAND 106 separate from the OP pool 202 prior to using the HC from the OP pool 202 as the UC of the higher priority namespace. Accordingly, the lower priority namespace may change from logical block size granularity to chunk size granularity and a higher priority namespace may be provided with logical block size granularity instead of chunk size granularity based on priority. In one or more embodiments, priority may be based on the factors described with reference to FIGS. 2A-2C and/or attributes of the namespace described in more detail below.

Although arrangements based on the first-come, first-serve, the size of the namespace and/or potential capacity loss has been described, the present disclosure is not limited thereto. For example, attributes of the namespaces may be used (e.g., see FIG. 3C), alone or in combination with the arrangements described with reference to FIGS. 2A-2C.

Figure 3A:
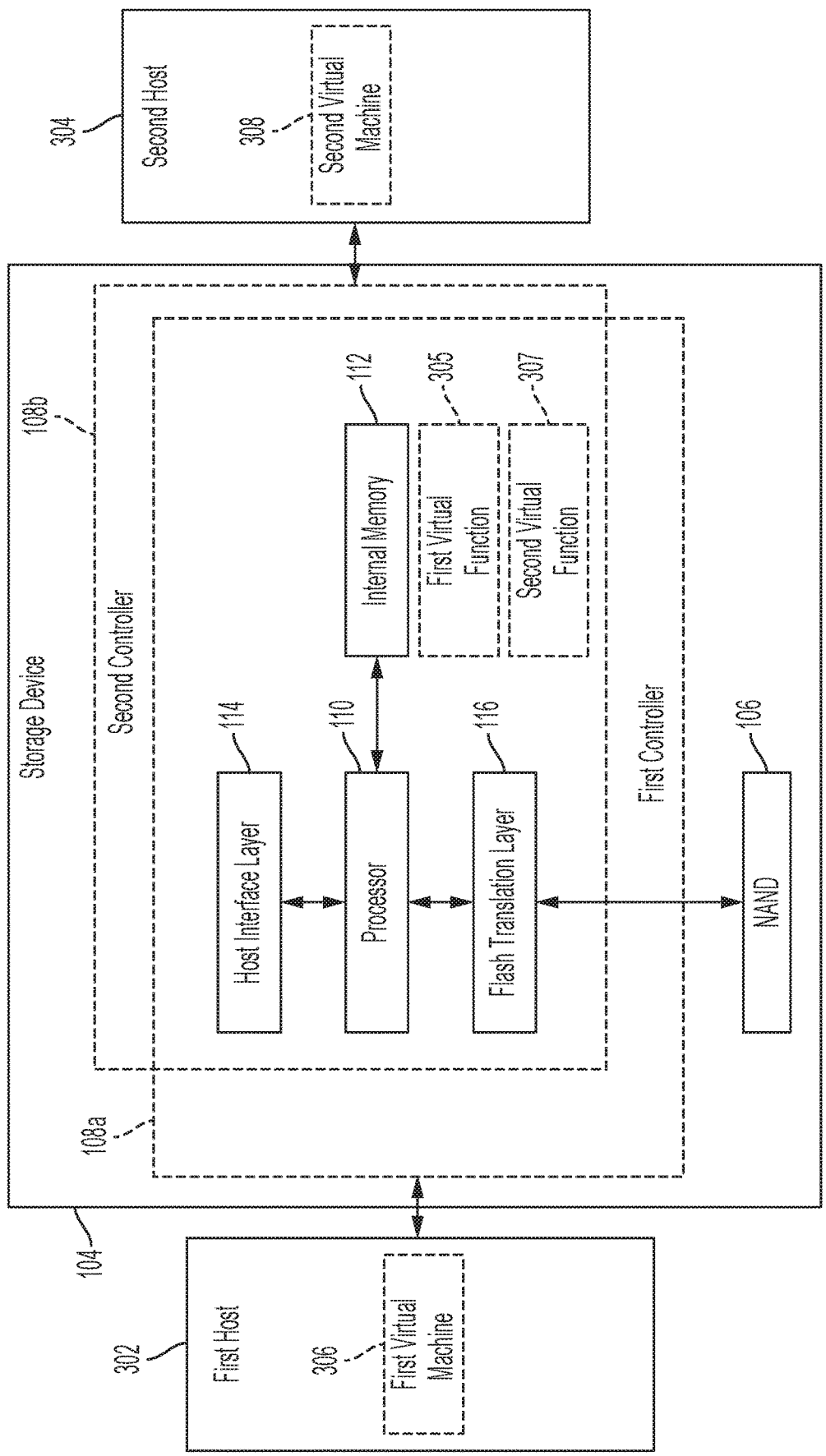
FIG. 3A is a system diagram according to one or more embodiments of the present disclosure.
Figure 3B:
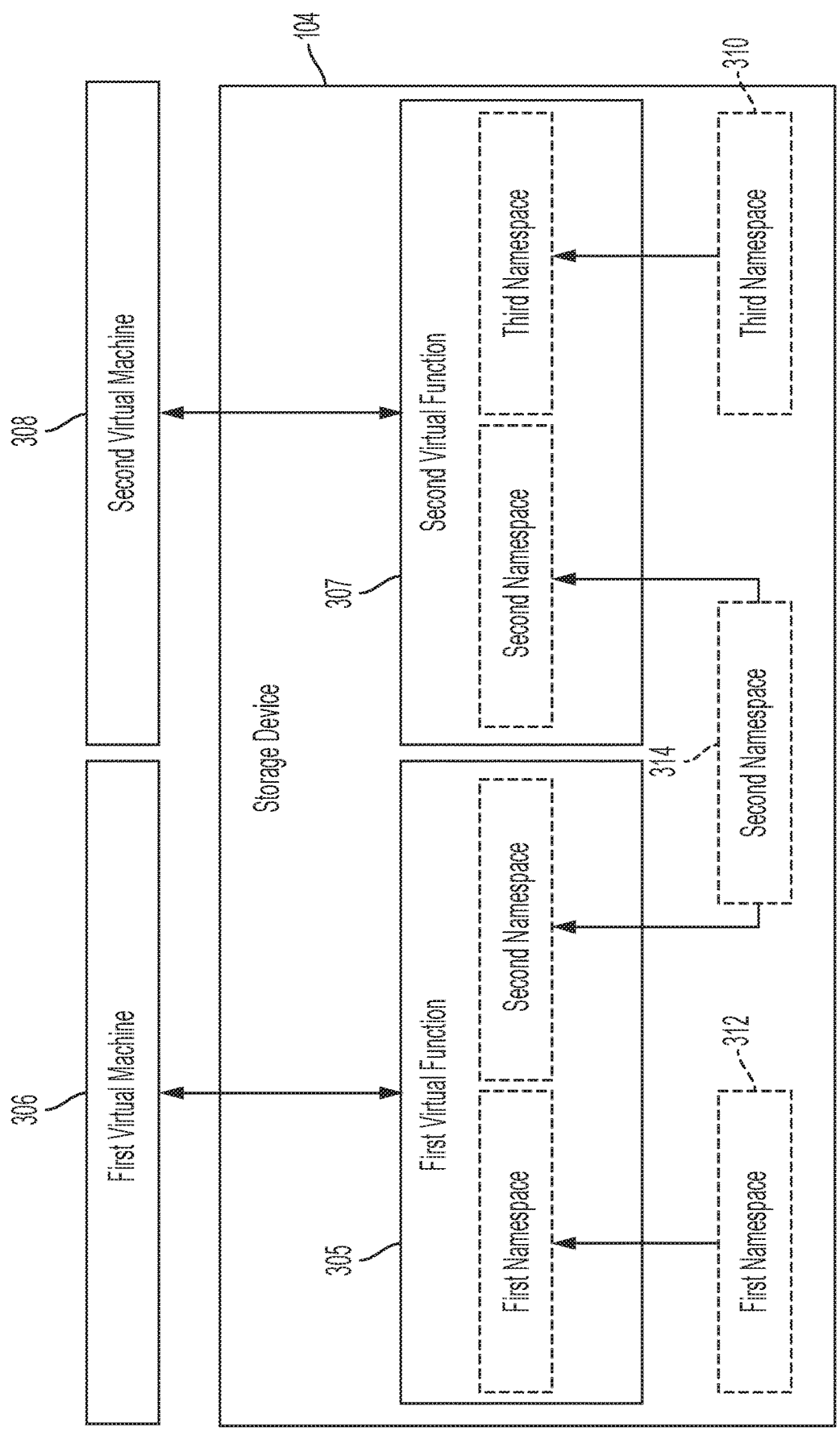
FIG. 3B is a block diagram illustrating shared and private namespaces according to one or more embodiments of the present disclosure.

FIG. 3A is a system diagram according to one or more embodiments of the present disclosure. FIG. 3B is a block diagram illustrating shared and private namespaces according to one or more embodiments of the present disclosure.

Referring to FIG. 3A, a system may include more than one host (e.g., a first host 302 and a second host 304) in communication with first or second controllers 108a, 108b of a storage device 104 (e.g., via two separate ports corresponding to the first and second controllers 108a, 108b with a PCIe link of the first host 302 and a PCIe link of the second host 304 respectively connected to the two separate ports). By way of example, in the system illustrated in FIG. 3A, although the first and second controllers 108a, 108b connect to separate hosts 302, 304, the NAND 106 and FTL 116 may not be divided by the two separate ports and the first and second controllers 108a, 108b. Further, in one or more embodiments, the processor 110, internal memory 112, and HIL 114 may not be divided by the two separate ports and the first and second controllers 108a, 108b.

In one or more embodiments, the first host 302 and the second host 304 may execute programs in software to generate a first virtual machine 306 and a second virtual machine 308 respectively. The first virtual machine 306 and the second virtual machine 308 may emulate the functionality of a computing environment. In one or more embodiments, the first controller 108a and/or the second controller 108b may provide a first virtual function 305 and a second virtual function 307 for use as a connection to the first virtual machine 306 and the second virtual machine 308 respectively to manage namespaces. Therefore, the storage device 104 may include both a physical connection (e.g., via a PCIe link) and a virtual connection (e.g., via virtualization) to the first host 302 and/or the second host 304 to manage namespaces (e.g., namespaces with a shared attribute).

As shown in FIG. 3A, the storage device 104 may include a processor 110, such as a CPU, and an internal memory 112 (e.g., DRAM, SRAM, flash memory, and/or the like). Logic stored in the internal memory 112 (e.g., DRAM) and/or firmware (e.g., ASIC or FPGA) may be used or executed by the processor 110 for carrying out one or more processes or process modules described herein, such as, for example, the functions of a HIL 114, a FTL 116, the first virtual function 305, and the second virtual function 307. The processor 110 and the internal memory 112 may be one or more processors and/or one or more memory devices operating alone or in combination with each other and may be components of the first controller 108a, the second controller 108b, and/or any other controller of the storage device.

In one or more embodiments, the first and second hosts 302, 304 may send a request to create a first namespace 312, a second namespace 314, and a third namespace 310 with set attributes via corresponding physical connections. In one or more embodiments, the first and second virtual machines 306, 308 may send a request to create a first namespace 312, a second namespace 314, and a third namespace 310 with set attributes via virtual connections.

As shown in FIG. 3B, the first namespace 312 and the third namespace 310 may be designated as private namespaces, and the second namespace 314 may be designated as a shared namespace between the first virtual machine 306 and the second virtual machine 308 with communications transmitted via virtual connections. However, the present disclosure is not limited thereto. In one or more embodiments, the first namespace 312 and the third namespace 310 may be designated as private namespaces, and the second namespace 314 may be designated as a shared namespace between the first host 302 and the second host 304 with communications transmitted via physical connections.

In the physical case, the first controller 108a may report information to the first host 302 such that the first host 302 may receive information from the HIL 114 and send commands to the HIL 114 relating to the second namespace 314 and the first namespace 312. In one or more embodiments, the second controller 108b may report information to the second host 304 such that the second host 304 may receive information from the HIL 114 and send commands to the HIL 114 relating to the second namespace 314 and the third namespace 310.

In the virtual case, the first virtual function 305 of the storage device 104 may report information to the first virtual machine 306 such that the first virtual machine 306 may receive information from the first virtual function 305 and send commands to the first virtual function 305 relating to the second namespace 314 and the first namespace 312. In one or more embodiments, the second virtual function 307 of the storage device 104 may report information to the second virtual machine 308 such that the second virtual machine 308 may receive information from the second virtual function 307 and send commands to the second virtual function 307 relating to the second namespace 314 and the third namespace 310.

Figure 3C:
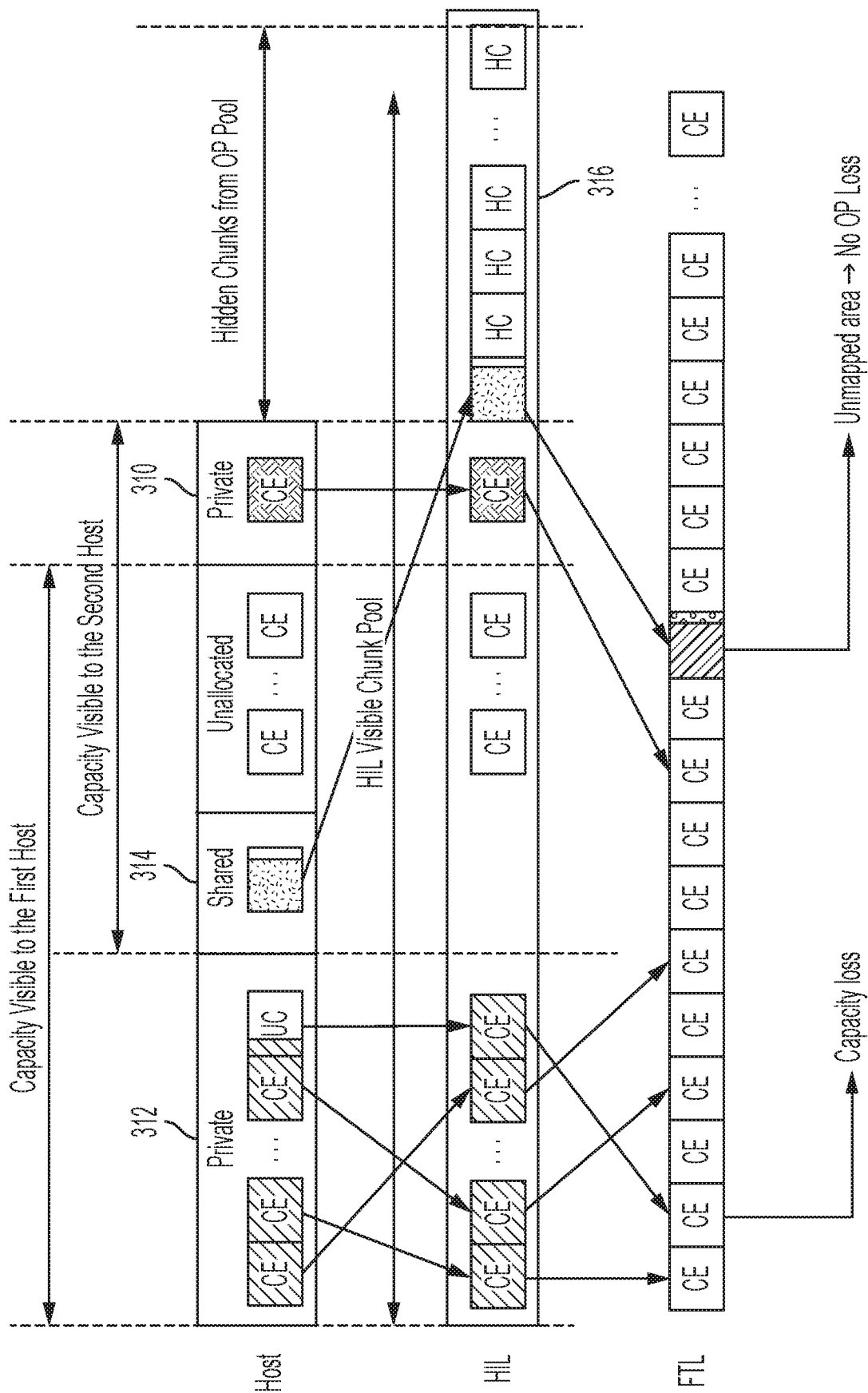
FIG. 3C is a block diagram illustrating an example of namespace management based on an attribute of namespaces according to one or more embodiments of the present disclosure.

FIG. 3C is a block diagram illustrating an example of namespace management according to one or more embodiments of the present disclosure.

Referring to FIG. 3C, the designation of shared and private may be used as a factor to determine whether HCs from the OP pool 316 should be used to provide logical block size granularity. In this case, an HC from the OP pool 316 may be used for shared namespaces including an UC to absorb the UC and an HC from the OP pool 316 may not be used for private namespaces including an UC. For example, as shown in FIG. 3C, the first namespace 312 including a UC may be private, and therefore, an HC from the OP pool 316 may not be used as the UC, thereby leading to use of a chunk of memory separate from the OP pool 316 which may result in capacity loss. In the illustrated embodiment, the second namespace 314 including a UC is shared, and therefore, an HC from the OP pool 316 may be used as the UC to avoid capacity loss (e.g., by providing logical block size granularity).

Although shared namespace and private namespace are used as an example for determining whether to apply logical block size granularity, the present disclosure is not limited thereto as the shared namespace and the private namespace designation is an example of one attribute of the namespace that may be used. In other embodiments, any suitable attribute of the namespace (e.g., the format of the namespace such as logical block size and/or whether metadata supporting end-to-end protection is provided, a group number associated with the namespace, privacy designation, a logical block size, and the like) may be used alone or in combination with other attributes. In one or more embodiments, attributes of the namespace may be used, alone or in combination with other factors such as first-come, first-serve basis, size of the namespace, and/or potential capacity loss.

Figure 4A:
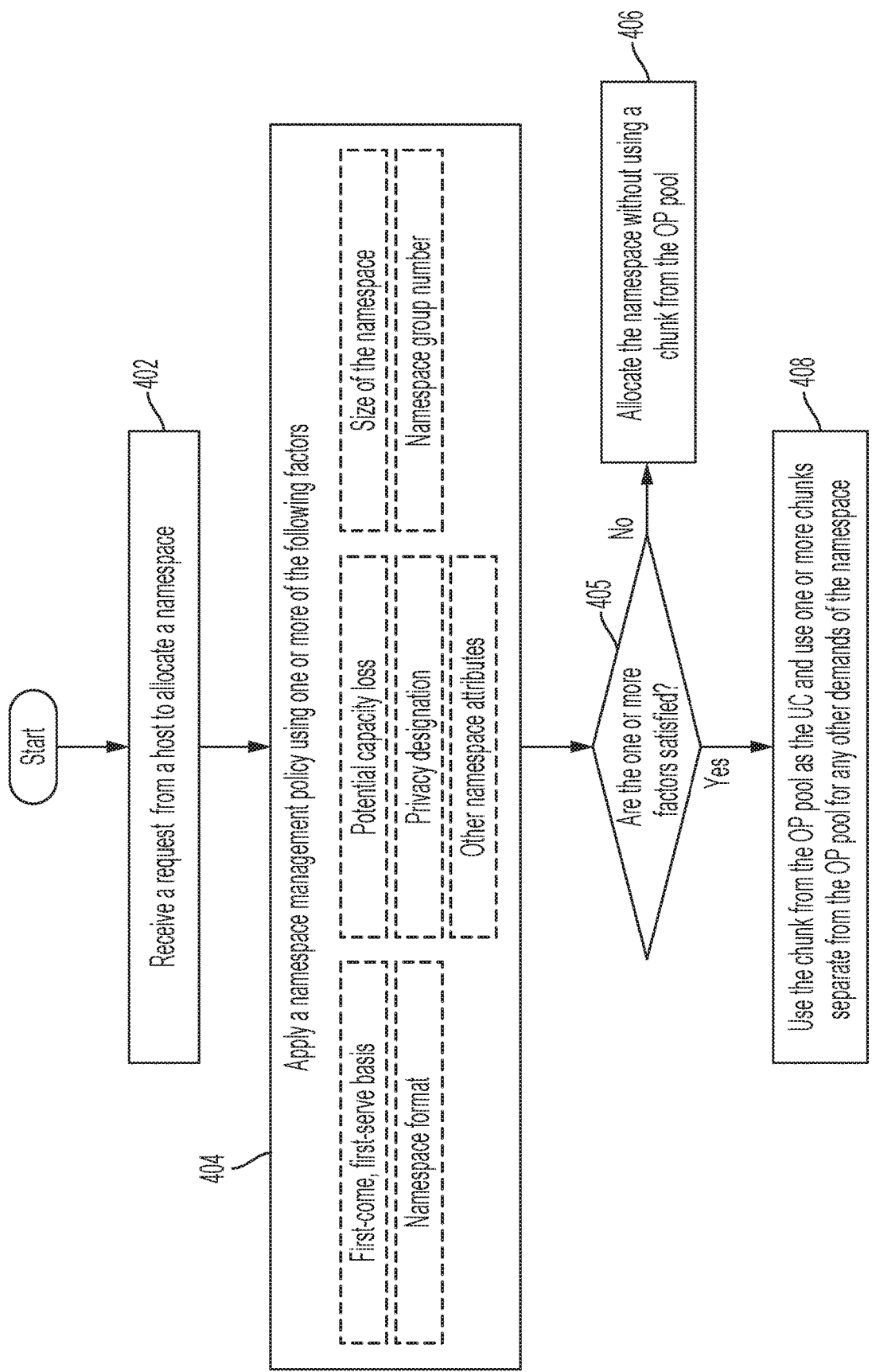
FIG. 4A is a flow chart of a method for static namespace management, according to one or more embodiments of the present disclosure.

FIG. 4A is a flow chart of a method for static namespace management, according to one or more embodiments of the present disclosure.

Referring to FIG. 4A, a system and method of static namespace management may include a controller 108 of the storage device 104 using NAND 106 of the storage device to allocate a namespace at the request of a host 102 (e.g., also see FIG. 1). As described with reference to FIGS. 2A-2C and 3C, the controller 108 may selectively use a chunk from an OP pool 202, 316 as an UC to provide logical block size granularity for the namespace.

In one or more embodiments, the method may include receiving a request from a host 102 to allocate a namespace (402). The host 102 may specify attributes of the namespace when sending the request to allocate the namespace to the controller 108.

In one or more embodiments, the controller 108 may apply a namespace management policy (404) to determine whether to use the chunk from the OP pool 202, 316 as the UC. For example, the controller 108 may determine whether the namespace includes an UC. If the namespace does not include any UCs (405), then the controller 108 may allocate the namespace without using a chunk from the OP pool 202, 316 (406). However, if the namespace includes the UC, then the controller 108 may determine whether one or more conditions for applying logical block size granularity are met.

For example, the controller 108 may check whether the HIL 114 of the controller 108 has a chunk (e.g., an HC) from the OP pool 202, 316 available to be used as the UC. If no chunk from the OP pool 202, 316 is available to be used as the UC (405), then the controller 108 may allocate the namespace without using a chunk from the OP pool (406) thereby resulting in capacity loss due to the UC. If a chunk is available at the HIL 114 from the OP pool 202, 316, then the controller 108 may consider one or more additional factors to determine whether to use the chunk from the OP pool 202, 316 as the UC.

Although the availability of a chunk from the OP pool 202, 316 is described as a condition for applying logical block size granularity, the present disclosure is not limited thereto. For example, the one or more conditions may include availability of a chunk from the OP pool 202, 316, whether the capacity of NAND 106 for namespaces is above or below a set threshold, and/or the like.

In one or more embodiments, the one or more additional factors considered by the namespace management policy (404) to determine whether to use the chunk from the OP pool 202, 316 as the UC of the namespace may be any factor discussed throughout the present disclosure and shown, for example, in step (404) of FIG. 4A. For example, the namespace management policy may operate on a first-come, first-serve basis or based on potential capacity loss, size of the namespace, namespace format, privacy designation, namespace group number, any other attributes of the namespace, or any combination thereof.

If the one or more conditions are not satisfied (405), then the controller 108 may allocate the namespace without using a chunk from the OP pool 202, 316 (406) resulting in capacity loss due to the UC. In other words, the namespace may be provided with chunk size granularity. If all of the factors are satisfied (405), then the controller may use the chunk from the OP pool 202, 316 as the UC and use one or more chunks separate from the OP pool 202, 316 for any other demands (e.g., additional chunks) of the namespace (408). By using the chunk from the OP pool 202, 316 as the UC, logical block size granularity may be provided for the namespace.

Figure 4B:
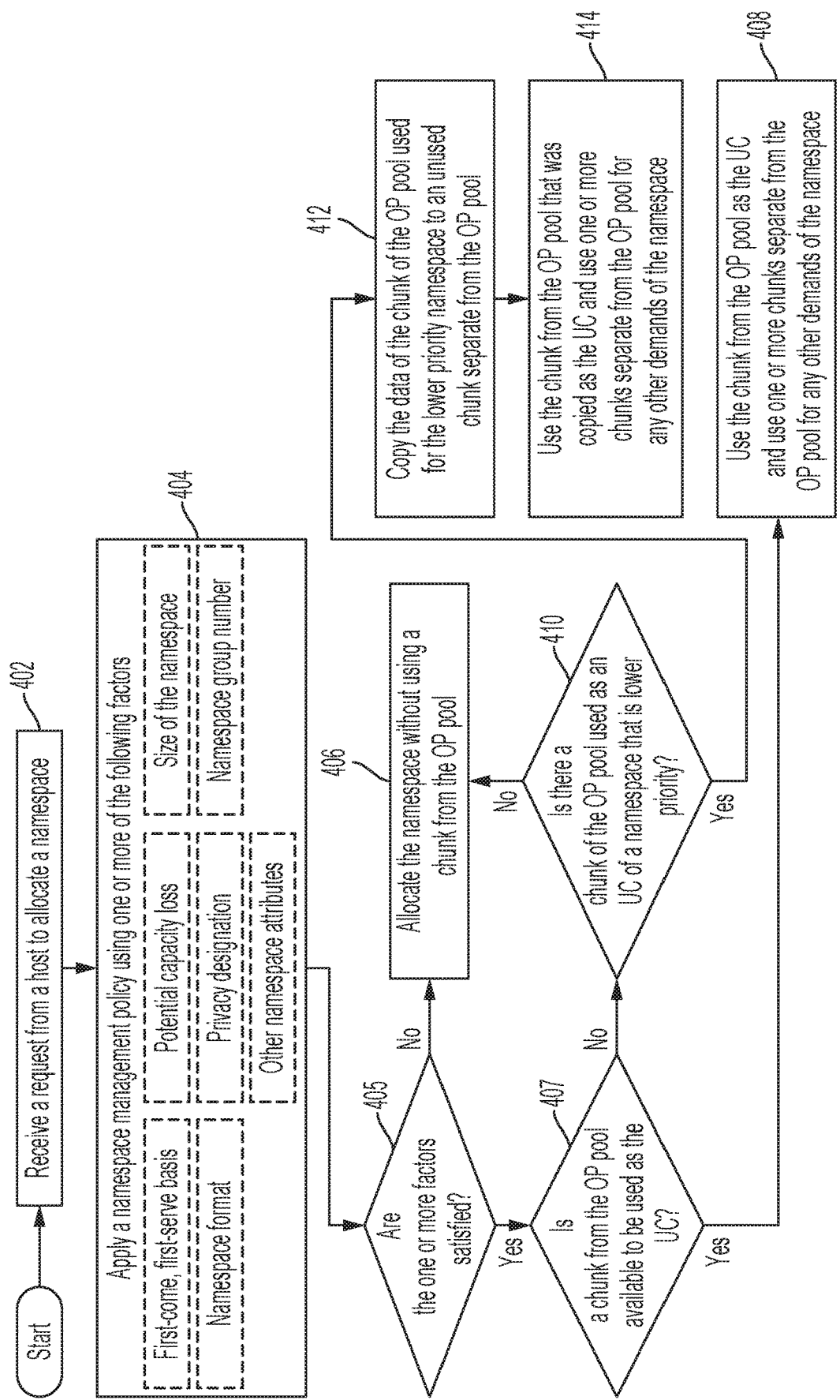
FIG. 4B is a flow chart of a method for dynamic namespace management, according to one or more embodiments of the present disclosure.

FIG. 4B is a flow chart of a method for dynamic namespace management, according to one or more embodiments of the present disclosure.

Referring to FIG. 4B, a system and method of dynamic namespace management may include a controller 108 of the storage device 104 using NAND 106 of the storage device to allocate a namespace at the request of a host 102 (e.g., also see FIG. 1). As described with reference to FIGS. 2A-2C and 3C, the controller 108 may selectively use a chunk from an OP pool 202, 316 as the UC to provide logical block size granularity for the namespace.

In one or more embodiments, the method may include receiving a request from a host 102 to allocate a namespace (402). The host 102 may specify attributes of the namespace when sending the request to allocate the namespace to the controller 108. In one or more embodiments, the controller 108 may apply a namespace management policy (404) to determine whether to use the chunk from the OP pool 202, 316 as the UC. For example, the controller 108 may determine whether the namespace includes an UC. If the namespace does not include any UCs (405), then the controller 108 may allocate the namespace without using a chunk from the OP pool (406).

In one or more embodiments, the namespace management policy may consider one or more additional factors to determine whether to use the chunk from the OP pool 202, 316 as the UC of the namespace. The one or more additional factors may be any factor discussed throughout the present disclosure and shown, for example, in step (404) of FIG. 4B. For example, the namespace management policy may operate on a first-come, first-serve basis or based on capacity loss, size of the namespace, namespace format, privacy designation, namespace group number, any other attributes of the namespace, or any combination thereof.

If the one or more conditions are not satisfied (405), then the controller 108 may allocate the namespace without using a chunk from the OP pool 202, 316 (406) resulting in capacity loss due to the UC. In other words, the namespace may be provided with chunk size granularity. If all of the factors are satisfied (405) and a chunk from the OP pool 202, 316 is available to be used as the UC (407), then the controller may use the chunk from the OP pool 202, 316 as the UC and use one or more chunks separate from the OP pool 202, 316 for any other demands (e.g., additional chunks) of the namespace (408). By using the chunk from the OP pool 202, 316 as the UC, logical block size granularity may be provided for the namespace.

However, if a chunk from the OP pool 202, 316 is not available to be used as the UC (407), then the controller 108 may consider a priority of the namespace compared to the priority of existing namespaces including UCs where a chunk of the OP pool 202, 316 has been used as the UC of the existing namespaces (410). For example, based on the factors of the namespace management policy of step (404), the controller 108 may determine that the new namespace is more suited (e.g., higher priority) for logical block size granularity than an existing namespace (e.g., lower priority namespace) where a chunk of the OP pool 202, 316 has been used as the UC (410). If the new namespace is a higher priority than the priority of the existing namespace, then the controller 108 may copy the data of the chunk of the OP pool 202, 316 used for the lower priority namespace to an unused chunk separate from the OP pool 202, 316 (412) thereby resulting in capacity loss associated with the lower priority namespace. In other words, the data previously absorbed by the chunk of the OP pool 202, 316 may be copied to a chunk of NAND 106 separate from the OP pool 202 for the lower priority namespace. Further, the controller 108 may use the now available chunk (e.g., the chunk that was copied) from the OP pool 202, 316 as the UC of the higher priority namespace and use one or more chunks separate from the OP pool 202, 316 for any other demands of the higher priority namespace (414). As such, the lower priority namespace may change from logical block size granularity to chunk size granularity while the higher priority namespace is provided with logical block size granularity despite all of chunks of the OP pool 202, 316 being used (e.g., concurrently or simultaneously used) as UCs. Accordingly, the dynamic approach enables the controller 108 to adaptively accommodate namespace requests despite all of the chunks from the OP pool 202, 316 at the HIL 114 of the controller 108 being used (e.g., concurrently or simultaneously used) as UCs.

In one or more embodiments, the controller 108 may compare the priority of the new namespace to each of the existing namespaces to determine or identify which existing namespace, if any, may be changed from logical block size granularity to chunk size granularity as described in steps (410), (412), (414). In other words, in a non-limiting example, the new namespace may have a higher priority than more than one existing namespace and the controller 108 may select the lowest priority namespace to change from logical block size granularity to chunk size granularity.

If the new namespace is lower priority than all of the existing namespaces (410), then the controller 108 may allocate the namespace without using a chunk from the OP pool (406) resulting in capacity loss due to the UC.

Accordingly, as disclosed herein, embodiments of the present disclosure provide a system and method of namespace management to provide logical block size granularity. Further, systems and methods of one or more embodiments of the present disclosure provide logic for static and dynamic adjustments to namespaces being provided with logical block size granularity based on one or more factors described herein.

In the drawings, the relative sizes of elements, layers, and regions may be exaggerated and/or simplified for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

As used herein, the terms "substantially", "about", and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device configured to support a number of namespaces, the storage device comprising:
    a memory; and
    a controller coupled to the memory and comprising:
        an internal memory;
        a host interface layer; and
        a flash translation layer configured to report to the host interface layer a first over-provisioning chunk from an over-provisioning pool and a first chunk separate from the over-provisioning pool,
    wherein the controller is configured to receive a command at the host interface layer to utilize a portion of the memory for a first namespace from among the number of namespaces, the first namespace comprising an unaligned chunk,
    wherein the controller is configured to utilize the first over-provisioning chunk as the unaligned chunk of the first namespace,
    wherein a number of over-provisioning chunks to be utilized as unaligned chunks is less than the number of namespaces, and
    wherein the number of over-provisioning chunks to be utilized as unaligned chunks is based on an amount of the internal memory of the controller.

2. The storage device of claim 1, wherein a type of the memory of the storage device is triple-level cell flash, quad-level cell flash, or Z-NAND type, and wherein the number of namespaces is based on the type of the memory.

3. The storage device of claim 1, wherein the host interface layer comprises
    a visible chunk pool comprising the first chunk; and
    a hidden chunk pool comprising the first over-provisioning chunk,
    wherein the host interface layer is configured to report information about the visible chunk pool to a host and to hide information about the hidden chunk pool from the host, and wherein the host is configured to send the command to the storage device to utilize the portion of the memory for the first namespace from among the number of namespaces.

4. The storage device of claim 1, wherein the controller is further configured to utilize the first over-provisioning chunk for the first namespace on a first-come, first-serve basis.

5. The storage device of claim 1, wherein the controller is further configured to utilize the first over-provisioning chunk based on a privacy designation, a format, or a group number of the first namespace.

6. The storage device of claim 1, wherein the controller is further configured to utilize the first over-provisioning chunk based on a potential capacity loss of the first namespace associated with the first namespace being above or below a set threshold.

7. The storage device of claim 1, wherein the controller is further configured to utilize the first over-provisioning chunk based on a size of the first namespace being above or below a set threshold.

8. A system comprising:
the storage device of claim 1; and
a host configured to send the command to the storage device to utilize the portion of the memory for the first namespace from among the number of namespaces.

9. A method of managing namespaces in a storage device, the method comprising:
supporting, by the storage device, a number of namespaces;
reporting, by a flash translation layer of a controller of the storage device, to a host interface layer of the controller of the storage device a first over-provisioning chunk from an over-provisioning pool and a first chunk separate from the over-provisioning pool;
receiving, by the storage device, a command at the host interface layer to utilize a portion of a memory for a first namespace from among the number of namespaces, the first namespace comprising an unaligned chunk;
utilizing, by the controller, the first over-provisioning chunk as the unaligned chunk of the first namespace; and
supporting, by the controller, a number of over-provisioning chunks to be utilized as unaligned chunks, the number of over-provisioning chunks being based on an amount of an internal memory of the controller,
wherein the number of over-provisioning chunks to be utilized as unaligned chunks is less than the number of namespaces.

10. The method of claim 9, the method further comprising supporting the number of namespaces based on a type of the memory of the storage device, wherein the type of the memory is triple-level cell flash, quad-level cell flash, or Z-NAND type.

11. The method of claim 9, the method further comprising:
reporting, by the host interface layer, to a host information about a visible chunk pool comprising the first chunk;
hiding, by the host interface layer, information about a hidden chunk pool comprising the first over-provisioning chunk from the host; and
sending, by the host, the command to the storage device to utilize the portion of the memory for the first namespace from among the number of namespaces.

12. The method of claim 9, the method further comprising utilizing, by the controller, the first over-provisioning chunk for the first namespace on a first-come, first-serve basis.

13. The method of claim 9, the method further comprising utilizing, by the controller, the first over-provisioning chunk based on a privacy designation, a format, or a group number of the first namespace.

14. The method of claim 9, the method further comprising utilizing, by the controller, the first over-provisioning chunk based on a potential capacity loss of the first namespace associated with the first namespace being above or below a set threshold.

15. The method of claim 9, the method further comprising utilizing, by the controller, the first over-provisioning chunk based on a size of the first namespace being above or below a set threshold.

16. A method of managing namespaces in a storage device, the storage device comprising a memory and a controller, the controller comprising a host interface layer and a flash translation layer, the method comprising:
reporting, by the flash translation layer, to the host interface layer a first over-provisioning chunk from an over-provisioning pool and a first chunk separate from the over-provisioning pool;
receiving, by the controller, a first command at the host interface layer to utilize a first portion of the memory for a first namespace, the first namespace comprising a first unaligned chunk associated with a first potential capacity loss;
utilizing, by the controller, the first over-provisioning chunk as the first unaligned chunk of the first namespace;
receiving, by the controller, a second command at the host interface layer to utilize a second portion of the memory for a second namespace, the second namespace comprising a second unaligned chunk;
utilizing, by the controller, the first chunk as the second unaligned chunk of the second namespace; and
supporting, by the controller, a number of over-provisioning chunks to be utilized as unaligned chunks, the number of over-provisioning chunks being based on an amount of an internal memory of the controller.

17. The method of claim 16, the method further comprising supporting, by the storage device, a number of namespaces based on a type of the memory of the storage device, wherein the type of the memory is triple-level cell flash, quad-level cell flash, or Z-NAND type.

18. The method of claim 16, the method further comprising:
reporting, by the host interface layer, to a host information about a visible chunk pool comprising the first chunk;
hiding, by the host interface layer, information about a hidden chunk pool comprising the first over-provisioning chunk from the host;
sending, by the host, the first command to the storage device to utilize the first portion of the memory for the first namespace; and
sending, by the host, the second command to the storage device to utilize the second portion of the memory for the second namespace.

* * * * *